(12) United States Patent
Song et al.

(10) Patent No.: US 10,615,452 B2
(45) Date of Patent: Apr. 7, 2020

(54) HIGH VOLTAGE RECHARGEABLE MAGNESIUM CELL

(75) Inventors: Wei Song, Canton, MI (US); Timothy Sean Arthur, Ann Arbor, MI (US); Claudiu Bucur, Ypsilanti, MI (US); Masaki Matsui, Mie (JP); John Muldoon, Saline, MI (US); Nikhilendra Singh, Ypsilanti, MI (US); Ruigang Zhang, Ypsilanti, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 94 days.

(21) Appl. No.: 13/484,827

(22) Filed: May 31, 2012

(65) Prior Publication Data

US 2013/0004830 A1    Jan. 3, 2013

Related U.S. Application Data (60) Provisional application No. 61/499,823, filed on Jun. 22, 2011.

(51) Int. Cl.
*H01M 10/054* (2010.01)
*H01M 2/02* (2006.01)
*H01M 4/66* (2006.01)
*H01M 10/0568* (2010.01)

(52) U.S. Cl.
CPC ....... *H01M 10/054* (2013.01); *H01M 2/0272* (2013.01); *H01M 4/661* (2013.01); *H01M 10/0568* (2013.01)

(58) Field of Classification Search
None
See application file for complete search history.

(56) References Cited

U.S. PATENT DOCUMENTS

| | | | |
|---|---|---|---|
| 8,722,242 B2* | 5/2014 | Muldoon et al. | 429/188 |
| 2008/0182176 A1 | 7/2008 | Aurbach et al. | |
| 2010/0196762 A1* | 8/2010 | Yamamoto et al. | 429/231.6 |
| 2011/0091753 A1* | 4/2011 | Wang et al. | 429/94 |
| 2011/0159381 A1* | 6/2011 | Doe et al. | 429/337 |

FOREIGN PATENT DOCUMENTS

| | | |
|---|---|---|
| JP | 58-225577 A | 12/1983 |
| JP | 02-18165 A | 7/1990 |
| JP | 11-345610 A | 12/1999 |

(Continued)

OTHER PUBLICATIONS

Japanese Patent Office Opposition No. 2017-700557 dated Jun. 30, 2017 filed against Japanese Patent No. 6039258 (Patentee: Toyota Motor Corporation).

(Continued)

*Primary Examiner* — Jonathan Crepeau
(74) *Attorney, Agent, or Firm* — Dinsmore & Shohl LLP (57) ABSTRACT

A high voltage rechargeable magnesium cell includes an anode and cathode housing. A magnesium metal anode is positioned within the housing. A high voltage electrolyte is positioned proximate the anode. A metal oxide cathode is positioned proximate the high voltage electrolyte. The magnesium cell includes a multi-cycle charge voltage up to at least 3.0 volts and includes a reversible discharge capacity.

17 Claims, 8 Drawing Sheets

(56) References Cited

FOREIGN PATENT DOCUMENTS

| JP | 2000-012016 A | 1/2000 |
| JP | 2001076721 A | 3/2001 |
| JP | 2001-332256 A | 11/2001 |
| JP | 2002025555 A | 1/2002 |
| WO | 2009/031511 | * 3/2009 |

OTHER PUBLICATIONS

John Muldoon et al, "Electrolyte roadblocks to a magnesium rechargeable battery", Energy Environ. Sci., 2012,5, pp. 5941-5950.
Gentaro Kanoh and Masato Kasamori, "Properties and Discharge Charactertistics of Chemical Manganese Dioxide (I)", Research report of Faculty of Engineering, University of Fukui, Mar. 1985, vol. 33, No. 1, pp. 33-41.

* cited by examiner

HIGH VOLTAGE RECHARGEABLE MAGNESIUM CELL

REFERENCE TO RELATED APPLICATIONS

This application claims priority of U.S. Provisional Patent Application Ser. No. 61/499,823, filed Jun. 22, 2011 the entire contents of which are incorporated herein by reference.

FIELD OF THE INVENTION

The invention relates to electrochemical devices such as batteries, in particular rechargeable batteries, such as a rechargeable magnesium battery.

BACKGROUND OF THE INVENTION

Rechargeable batteries, such as lithium-ion batteries, have numerous commercial applications. Capacity density is an important characteristic, and higher capacity densities are desirable for a variety of applications.

A magnesium ion in a magnesium or magnesium-ion battery carries two electrical charges, in contrast to the single charge of a lithium ion. Improved electrode materials would be very useful in order to develop high capacity density batteries.

SUMMARY OF THE INVENTION

In one aspect, the invention discloses a high voltage rechargeable magnesium cell that includes an anode can and a magnesium metal anode positioned proximate the anode can. A high voltage electrolyte is positioned proximate the anode. A metal oxide cathode is positioned proximate the high voltage electrolyte. A cathode current collector is positioned proximate the cathode. A cathode can is positioned proximate the cathode current collector. The cathode can or housing includes a layer of inert material. The magnesium cell includes a multi-cycle charge voltage of at least 3.0 volts and includes a reversible discharge capacity.

In another aspect, there is disclosed a high voltage rechargeable magnesium cell that includes an anode and cathode housing. A magnesium metal anode is positioned within the housing. A high voltage electrolyte is positioned proximate the anode. A metal oxide cathode is positioned proximate the high voltage electrolyte. The magnesium cell includes a multi-cycle charge voltage of at least 3.0 volts and includes a reversible discharge capacity.

DETAILED DESCRIPTION OF THE INVENTION

Examples of the present invention include electrochemical devices, such as batteries, in particular rechargeable batteries. Examples include magnesium-based batteries, and specifically to magnesium coin cells including a magnesium metal anode and a metal oxide cathode.

A rechargeable magnesium battery is expected to be a high energy battery system, because of its high capacity density. In particular, as compared to lithium-ion batteries, the magnesium ion transfers two electrons per magnesium ion. However, previously there have been no good cathode or anode active materials which can fully utilize a high energy electrolyte for a high voltage and reversible charging capacity cell.

In examples of the present invention, a high voltage rechargeable magnesium cell includes an anode and cathode housing. A magnesium metal anode is positioned within the housing. A high voltage electrolyte is positioned proximate the anode. A metal oxide cathode is positioned proximate the high voltage electrolyte. In another aspect, the magnesium cell includes a multi-cycle charge up to the voltage of at least 3.0 volts and includes a reversible discharge capacity.

In further examples of the present invention, a high voltage rechargeable magnesium cell includes an anode can and a magnesium metal anode positioned proximate the anode can. A high voltage electrolyte is positioned proximate the anode. A metal oxide cathode is positioned proximate the high voltage electrolyte. A cathode current collector is positioned proximate the cathode. A cathode can is positioned proximate the cathode current collector. The cathode can or housing may include a layer of inert material. In another aspect, the magnesium cell includes a multi-cycle charge voltage of at least up to 3.0 volts and includes a reversible discharge capacity.

The cathode active material includes a metal oxide material. For example metal oxides such as $MnO_2$ (alpha manganese dioxide stabilized by potassium), $V_2O_5$ and ion stabilized oxide or hollandiates of manganese, titanium or vanadium may be utilized. The active material may further include an electrically conductive material and a binder. Examples of electrically conducting materials include carbon particles, such as carbon black. Example binders include various polymers, such as PVDF, PTFE, SBR, and polyimide.

The anode active material may include magnesium. The active material may further include an electrically conductive material and a binder. Examples of electrically conducting materials include carbon particles, such as carbon black. Example binders include various polymers, such as PVDF, PTFE, SBR, and polyimide.

The high voltage electrolyte layer may include a separator which helps maintain electrical isolation between the positive and negative electrodes. A separator may include fibers, particles, web, porous sheet, or other form of material configured to reduce the risk of physical contact and/or short circuit between the electrodes. The separator may be a unitary element, or may include a plurality of discrete spacer elements such as particles or fibers. The electrolyte layer may include a separator infused with an electrolyte solution. In some examples, for example using a polymer electrolyte, the separator may be omitted.

The electrolyte layer may include a non-aqueous solvent, such as an organic solvent, and a salt of the active ion, for example a magnesium salt. Magnesium ions provided by the magnesium salt interact electrolytically with the active material(s). An electrolyte may be an electrolyte including or otherwise providing magnesium ions, such as a non-aqueous or aprotic electrolyte including a magnesium salt. The electrolyte may include an organic solvent. Magnesium ions may be present as a salt or complex of magnesium, or as any appropriate form.

An electrolyte may include other compounds, for example additives to enhance ionic conductivity, and may in some examples include acidic or basic compounds as additives. An electrolyte may be a liquid, gel, or solid. An electrolyte may be a polymer electrolyte, for example including a plasticized polymer, and may have a polymer infused with or otherwise including magnesium ions. In some examples, an electrolyte may include a molten salt. In one aspect, the electrolyte may include $HMDSMgCl+AlCl_3$ in THF, $PhMgCl+AlCl_3$ in THF or $Mg_2Cl_3$—$HMDSAlCl_3$ in THF. It should be realized that various other high voltage electrolytes may also be utilized.

As stated above, a battery may include an electrode having a cathode active material and may be present as a sheet, ribbon, particles, or other physical form. An electrode containing the cathode active material may be supported by a current collector.

A current collector may include a metal or other electrically conducting sheet on which the electrode is supported. In one aspect, the current collector may be formed of carbon, carbon paper, carbon cloth or a metal or noble metal mesh or foil.

The cathode housing or can may include a layer of inert material that separates the housing from the cathode or cathode current collector. In one aspect the inert material may include carbon or a noble metal such as platinum or gold.

Figure 1:
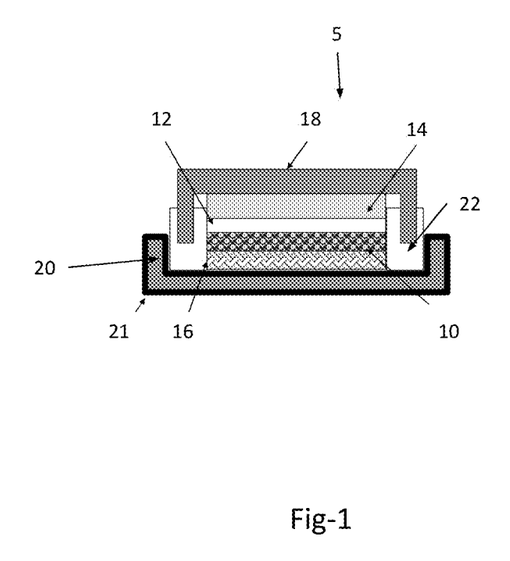
FIG. 1 is a diagram of an improved magnesium cell.

FIG. 1 shows a rechargeable magnesium cell 5. The cell 5 includes a positive electrode 10 including a cathode active material, an electrolyte layer 12, a negative electrode 14, a cathode current collector 16, a negative electrode housing 18, a positive electrode housing 20 including an inert layer 21, and a sealing gasket 22. The electrolyte layer 16 may include a separator soaked in electrolyte solution, and the positive electrode 10 may be supported by the cathode current collector 16. In this example, the negative electrode 14 includes an active material of magnesium metal and the positive electrode or cathode 10 may include a metal oxide.

Figure 2:
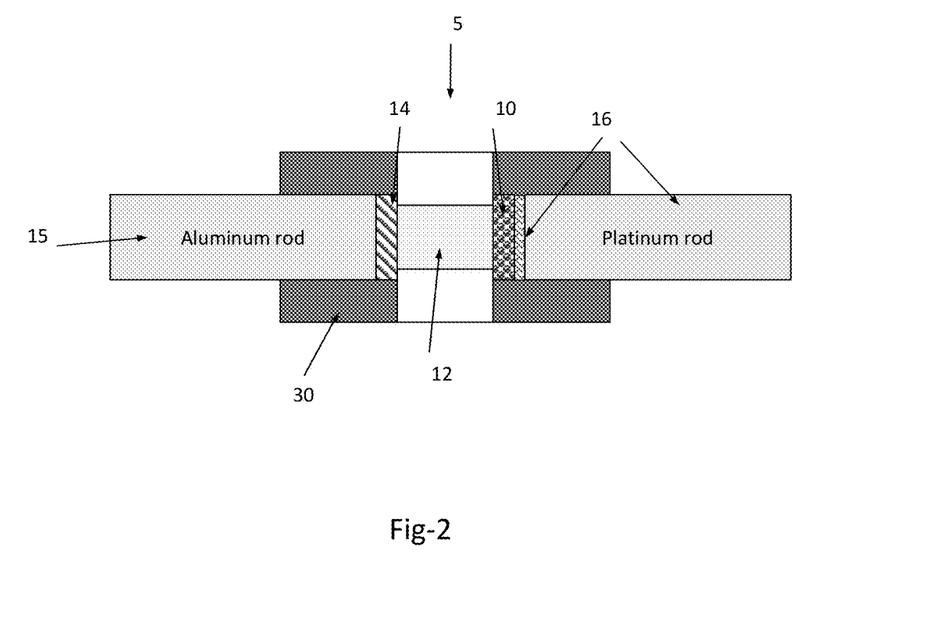
FIG. 2 is a diagram of an experimental magnesium cell including a magnesium anode, manganese oxide cathode, platinum cathode current color and an aluminum anode current collector in a PFE Swagelok cell.

As shown in FIG. 2, a perfluoroalkoxy (PFA) Swagelok cell 30 with an electrode area of 0.32 cm² was utilized to analyze the charge-discharge property of an $Mg/MnO_2$ rechargeable magnesium cell 5. The positive electrode 10 includes an active material of $\alpha$-$MnO_2$ (75% w/w), acetylene carbon black (15% w/w) and a polymer binder of polyvinylidene fluoride (10% w/w). The cathode 10 was coated on carbon paper as part of a current collector 16 and dried at 120° C. for 12 hours under vacuum. A magnesium foil was used as the negative electrode 14. An electrolyte 12 of $HMDSMgCl+AlCl_3$ in THF solution was used. A platinum rod and an aluminum rod were chosen as current collectors 16, 15 for the positive electrode and the negative electrode 10, 14, respectively. The Swagelok cell 30 was assembled in an Argon filled glove box and tested at 25° C. with current rate at C/5 for four cycles. The cutoff voltage was set at 0.8V-3.0V.

Figure 3:
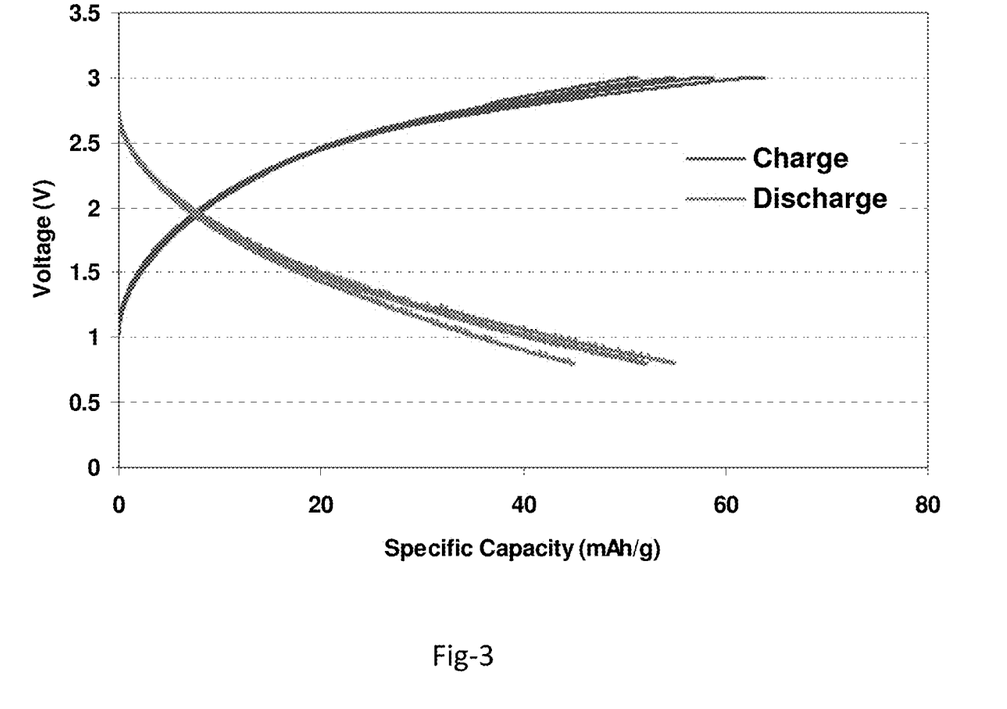
FIG. 3 is a voltage profile of the improved magnesium cell as a function of the specific capacity tested by magnesium/manganese dioxide half cell.

FIG. 3 shows charge/discharge curves for the cell of FIG. 2. As can be seen from the profile, the magnesium cell displayed a charge voltage of at least 3.0 volts and was approximately 3.0 volts over repeated charge and discharge cycles. Additionally, the magnesium cell displays a reversible discharge capacity.

Examples of the present invention also include various electrically-powered apparatus, such as consumer electronic devices, medical devices, electric or hybrid vehicles, or other apparatus including batteries according to examples of the present invention. Examples of the present invention include both primary (non-rechargeable, e.g. magnesium batteries) and secondary (rechargeable, e.g. magnesium-ion) batteries. Specific examples include rechargeable magnesium-ion batteries. The term magnesium-based battery includes both primary and secondary batteries, i.e. both magnesium batteries and magnesium-ion batteries. Examples of the present invention include any magnesium-based battery, including rechargeable magnesium-ion batteries capable of a capacity density greater than conventional lithium materials. Electrodes may be fabricated by any suitable method. For example, a paste may be formed of particles of the active material, a binder, and an electron-conducting material such as graphitic carbon particles or carbon black. The paste may be deposited on an electrically conducting substrate, such as a current collector, and heat treated as necessary.

Figure 4:
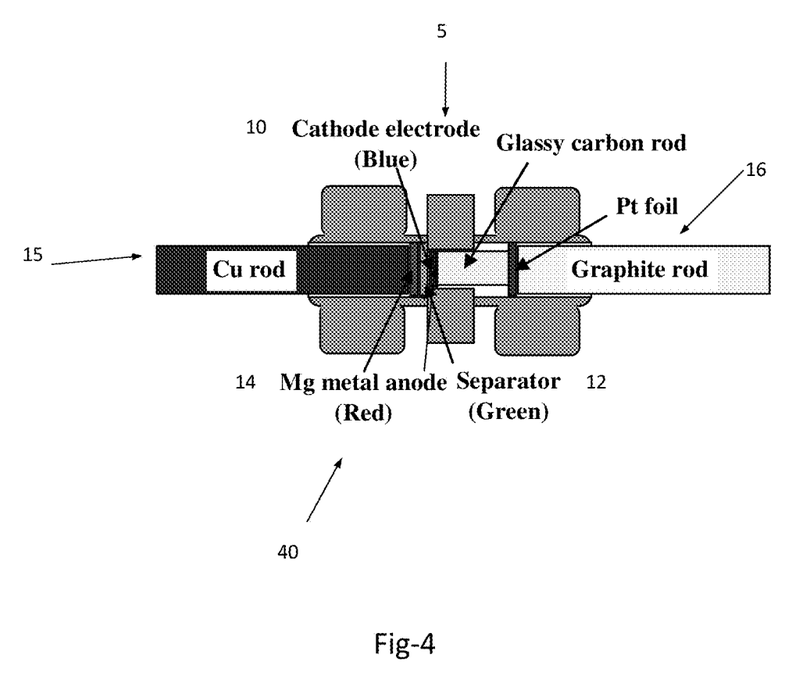
FIG. 4 is a diagram of an experimental magnesium cell including a magnesium anode, potassium stabilized alpha manganese oxide cathode, copper cathode current collector and a graphite anode current collector in a modified Swagelok cell.
Figure 5:
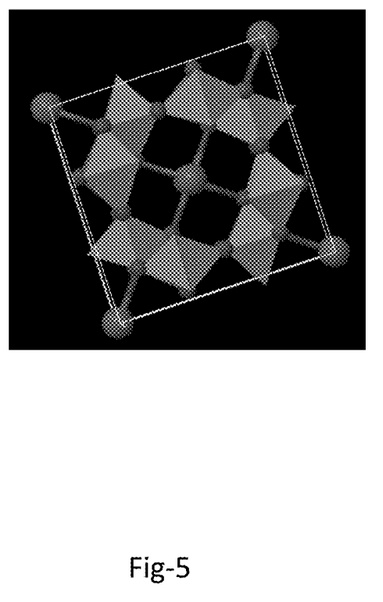
FIG. 5 is a diagram of the crystal structure of potassium stabilized alpha manganese dioxide.

As shown in FIG. 4, a modified Swagelok cell 40 was utilized to analyze the charge-discharge property of an Mg/potassium stabilized alpha $MnO_2$ rechargeable magnesium cell 5. Potassium stabilized $\alpha$-$MnO_2$ was purchased from Erachem Comilog, Inc. The positive electrode 10 was prepared by mixing 70 wt % $\alpha$-$MnO_2$, 20 wt % HS-100 carbon black and 10 wt % PTFE and then pressing to a 120 micrometer sheet.

The Two-electrode modified Swagelok cells were assembled in an Ar-filled dry box using Mg foil as a counter and reference electrode. 0.2 M $Mg_2Cl_3$—$HMDSAlCl_3$/THF was utilized as an electrolyte with a Celgard separator. The cycling was performed between 0.8 and 3.0 V. vs $Mg^{2+}/Mg$ at 25 μA using a standard Potentiostat with battery testing/cycling capability. A glassy carbon, platinum and graphite rod and a copper rod were chosen as current collectors 16, 15 for the positive electrode and the negative electrode 10, 14, respectively.

X-ray Photoelectron Spectroscopy (XPS) was done at Evans Analytical Group with a PHI 5802 Multitechnique. To avoid any contamination, all samples were thoroughly washed with THF and then sealed in a Vacuum Transfer Vessel before transfer into the XPS instrument. All samples were analyzed in a randomly selected location as received following a 1 minute $Ar^+$ sputter.

Figure 6:
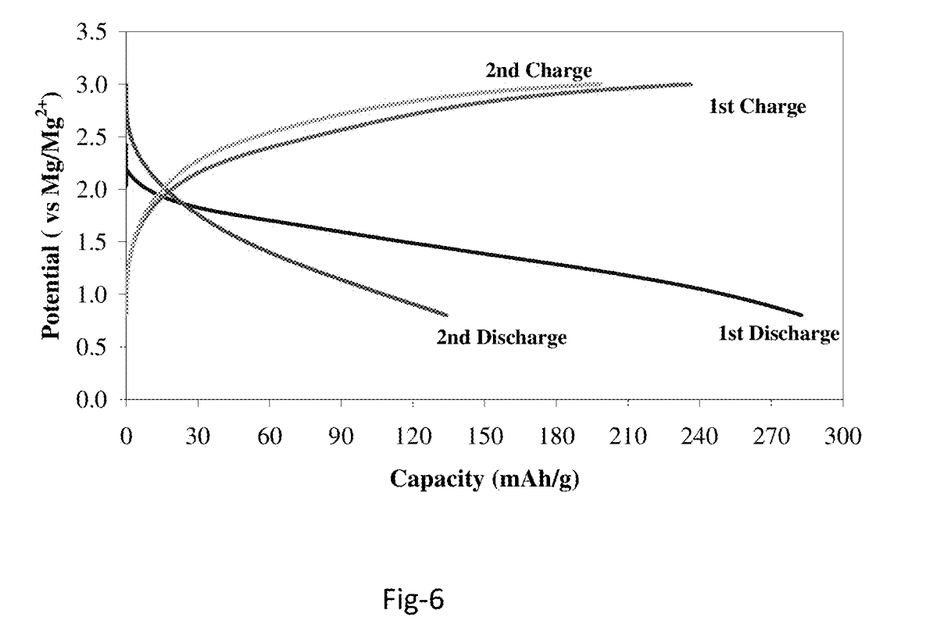
FIG. 6 is a voltage profile of the improved magnesium cell as a function of the specific capacity tested by magnesium/potassium stabilized alpha manganese dioxide half cell.

Referring to FIG. 6, there is shown the initial two charge/discharge curves of the potassium stabilized $\alpha$-$MnO_2$ shown in FIG. 4. The first discharge capacity is around 280 mAh/g, indicating the $\alpha$-$MnO_2$ framework can accommodate a significant amount of Mg at 0.8V. The final magnesiated composition of the cathode is approximately 0.47 Mg per Mn, or could be described as $Mg_{0.47}MnO_2$, where most of the $Mn^{4+}/Mn^{3+}$ redox pairs have been utilized. In addition, the initial capacity is much higher than the reported value in a Li-ion battery, which is normally around 200 mAh/g.

Figure 7:
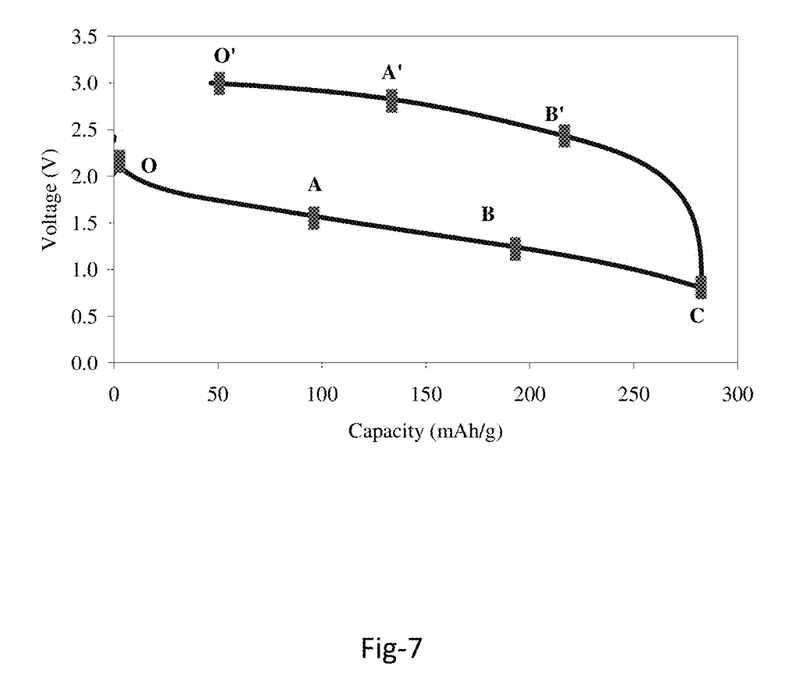
FIG. 7 is a plot of the voltage versus capacity for the electrochemical states of the XPS samples (indicated by the red bars).

Ex-situ XPS was utilized to check the oxidization state change of Mn as the function of Mg insertion and extraction. FIG. 7 shows the state of charge/discharge of each sample before running the XPS test.

Figure 8:
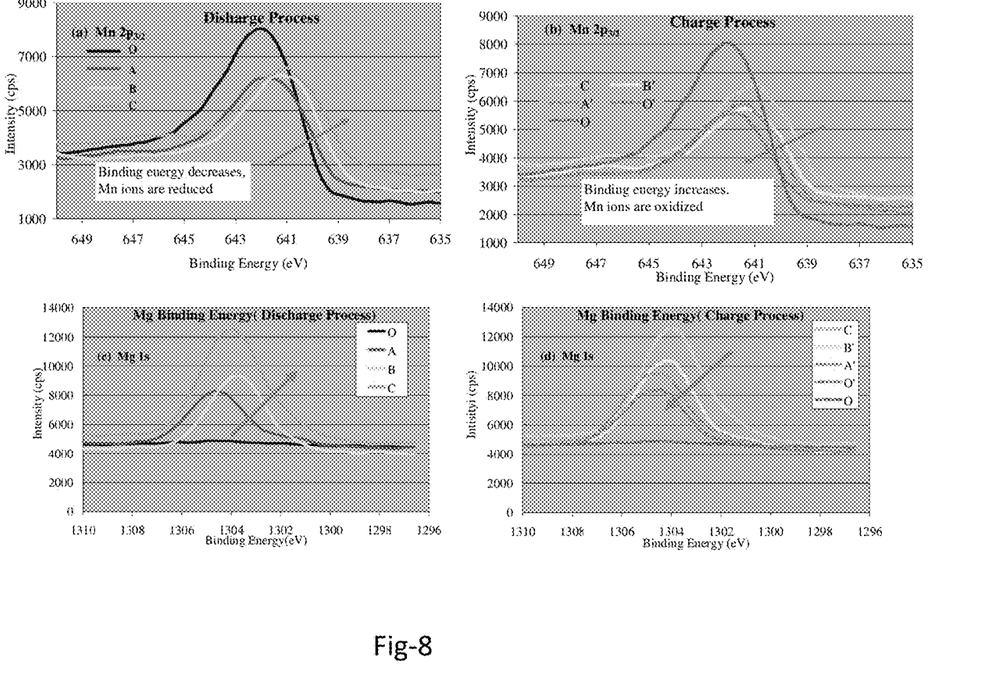
FIG. 8 displays the $Mn2P_{3/2}$ spectra plotted as a function of the intensity relative the binding energy for potassium stabilized alpha manganese dioxide.

FIG. 8 displays the Mn2P$_{3/2}$ spectra. As seen, the binding energy of Mn shifts to a lower energy during the discharge cycle and moves back to a higher energy during the charge cycle, which corresponds to the Mn reduction and oxidization processes, respectively. This change in binding energy is evidence of the redox reaction of MnO$_2$ as Mg ions are inserted and extracted. FIG. 8 also shows the reversible shift of binding energy of Mg. The oxide stage change of Mg may be related to the different insertion site and/or composition of Mg at different states of charge. The XPS results indicate that Mg can reversibly intercalate/deintercalate in potassium stabilized α-MnO$_2$ electrode.

An improved process of fabricating a battery, such as a rechargeable magnesium-ion battery, includes: providing an anode and cathode housing; providing a magnesium metal anode positioned within the housing: providing a high voltage electrolyte positioned proximate the anode; providing a metal oxide cathode positioned proximate the high voltage electrolyte; isolating the cathode housing from the electrolyte and metal oxide cathode wherein the magnesium cell includes a multi-cycle charge voltage of at least up to 3.0 volts and includes a reversible discharge capacity. The invention is not restricted to the illustrative examples described above. Examples described are not intended to limit the scope of the invention. Changes therein, other combinations of elements, and other uses will occur to those skilled in the art.

The invention claimed is:

1. A high voltage rechargeable magnesium cell comprising:
    an anode can;
    a magnesium metal anode positioned proximate the anode can:
    a high voltage electrolyte positioned proximate the anode;
    a metal oxide cathode positioned proximate the high voltage electrolyte;
    a cathode current collector positioned proximate the cathode, the cathode current collector comprising platinum;
    a cathode can positioned proximate the cathode current collector, the cathode can including a layer of inert material;
    wherein the magnesium cell includes a multi-cycle charge voltage of at least 3.0 volts and includes a reversible discharge capacity.

2. The high voltage rechargeable magnesium cell of claim 1 wherein the cathode includes a metal oxide selected from manganese dioxide and vanadium pentoxide.

3. The high voltage rechargeable magnesium cell of claim 1 wherein the cathode includes a metal oxide selected from: ion stabilized manganese dioxide, ion stabilized titanium oxides and ion stabilized vanadium oxides.

4. The high voltage rechargeable magnesium cell of claim 1 wherein the cathode current collector is formed of a mesh or foil.

5. The high voltage rechargeable magnesium cell of claim 1 wherein the cathode can includes an inert layer of carbon or a noble metal.

6. The high voltage rechargeable magnesium cell of claim 1 wherein the high voltage electrolyte includes HMDSMgCl+AlCl$_3$ in THF, PhMgCl+AlCl$_3$ in THF or Mg$_2$Cl$_3$-HMDSAlCl$_3$ in THF.

7. The high voltage rechargeable magnesium cell of claim 1 wherein the anode electrode includes a binder, an electrically conducting material, and the active material.

8. The high voltage rechargeable magnesium cell of claim 1 wherein the cathode electrode includes a binder, an electrically conducting material, and the active material.

9. The high voltage rechargeable magnesium cell of claim 1 wherein the high voltage electrolyte includes a separator.

10. A high voltage rechargeable magnesium cell comprising:
    an anode and cathode housing;
    a magnesium metal anode positioned within the housing:
    a high voltage electrolyte positioned proximate the anode;
    a metal oxide cathode positioned proximate the high voltage electrolyte; and
    a cathode current collector positioned proximate the cathode, the cathode current collector comprising platinum;
    wherein the magnesium cell includes a multi-cycle charge voltage of at least 3.0 volts and includes a reversible discharge capacity and wherein the cathode housing is electrolytically isolated from the electrolyte and metal oxide cathode and the electrolyte is stable against oxidation.

11. The high voltage rechargeable magnesium cell of claim 10 wherein the cathode housing includes a layer of inert material.

12. The high voltage rechargeable magnesium cell of claim 11 wherein the cathode housing includes an inert layer of carbon or a noble metal.

13. The high voltage rechargeable magnesium cell of claim 10 wherein the cathode includes a metal oxide selected from manganese dioxide, potassium stabilized manganese dioxide and vanadium pentoxide.

14. The high voltage rechargeable magnesium cell of claim 10 wherein the high voltage electrolyte includes HMDSMgCl+AlCl$_3$ in THF, Mg$_2$Cl$_3$-HMDSAlCl$_3$ in THF or PhMgCl+AlCl$_3$ in THF.

15. The high voltage rechargeable magnesium cell of claim 10 wherein the anode electrode includes a binder, an electrically conducting material, and the active material.

16. The high voltage rechargeable magnesium cell of claim 10 wherein the cathode electrode includes a binder, an electrically conducting material, and the active material.

17. The high voltage rechargeable magnesium cell of claim 10 wherein the high voltage electrolyte includes a separator.

* * * * *